United States Patent [19]
Hirose

[11] Patent Number: 5,557,429
[45] Date of Patent: Sep. 17, 1996

[54] IMAGE SIGNAL PROCESSING APPARATUS

[75] Inventor: Yoshitsugu Hirose, Kanagawa, Japan

[73] Assignee: Fuji Xerox Co., Ltd., Tokyo, Japan

[21] Appl. No.: 137,795

[22] Filed: Oct. 19, 1993

[30] Foreign Application Priority Data

Oct. 20, 1992 [JP] Japan ................... 4-306618

[51] Int. Cl.$^6$ .................. H04N 1/405; H04N 1/409; H04N 1/52; H04N 1/58
[52] U.S. Cl. .................. 358/532; 358/536; 358/456; 358/458; 358/463; 382/275
[58] Field of Search ................... 358/463, 532, 358/534, 536, 456, 457, 458, 454, 447, 448; 382/54, 260, 275, 263, 264, 267

[56] References Cited

U.S. PATENT DOCUMENTS 5,225,915   7/1993   Ciccone et al. ................... 358/454

FOREIGN PATENT DOCUMENTS

| 253482 | 10/1990 | Japan | G06F 15/62 |
| 295276 | 12/1990 | Japan | H04N 1/393 |
| 195267 | 8/1991 | Japan | H04N 1/40 |
| 3-234178 | 10/1991 | Japan . | |
| 373258 | 12/1992 | Japan | H04N 1/40 |

OTHER PUBLICATIONS

S. Honjo, "Design of Hard Copy and Study on Analysis of Image Quality Thereof", Jul. 1991, corresponding to S. Honjo & S. Taguchi; Paper.
Summaries of the 5th Intern. Congr. on Advances in Non–Impact Printing Technologies (SPSE), pp. 196 (Nov. 1989 San Diego, Calif.).

Primary Examiner—Scott A. Rogers
Attorney, Agent, or Firm—Finnegan, Henderson, Farabow, Garrett & Dunner, L.L.P.

[57] ABSTRACT

An image signal processing apparatus for converting an image data signal input by an image input terminal into another image data signal suitable for an image output terminal. In the apparatus, a quantity of noise of a spatial frequency characteristic difficult to visually perceive is generated in accordance with a level of the input image data signal, and the noise generated is superposed on the input image data signal. In handling a color image data signal, the noise is superposed on the color image data signal in a regional color space difficult to visually perceive.

8 Claims, 9 Drawing Sheets

IMAGE SIGNAL PROCESSING APPARATUS

BACKGROUND OF THE INVENTION

1. Field of the Invention

The present invention relates to an image signal processing method capable of reproducing an image formed in consideration of visual psychology in a color copying machine or the like, and to an image signal processing apparatus capable of reproducing such an image.

2. Discussion of the Related Art

Color reproduction, tone reproduction, sharpness, and granule characteristics may be enumerated for key characteristics in discussing the quality of the output image of a color copying machine. Many image processing techniques for exactly reproducing an image on an original document have been proposed.

Incidentally, the final image receiving system in which an information transfer medium is a color output image is the visual perceiving system of a human being. Therefore, in designing an image signal processing system, it is desirable to handle the image quality in consideration with the visual property of the ophthalmencephalon on the basis of the effects of visual psychology.

This concept will be understood when reading a report that effective images result from an exact color design where the color correction process is carried out in the L* a* b* space as a color perception uniform space. The technique to carry out the color correction process in the uniform color space is disclosed in Japanese Patent Unexamined Publication No. Hei. 3-234178, for example.

However, the present technology dealing with the image noise, which determines the granularity of the image, continues in such a level that the consistency of the sharpness and the granularity is secured by cutting off the high frequency band of the sharpness emphasizing filter. Honjo et al. successfully leads the image noise/tone relationship from the visual characteristic, and reports the fact that the presence of noise effectively conceals tone steps, or so-called pseudo contour (S. Honjo & S. Taguchi; Paper Summaries of the 5th Intern. Congr. on Advances in Non-Impact Printing Technologies (SPSE), pp. 196 (1989 Nov. San Diego, Calif.). The basic concept of this technique has been widely used in the form of the dithering method for the half-tone generation.

Little has been proposed about the image signal processing technique handling the image noise, which takes cues of the visual psychology into consideration. Any decisive method to reduce only the image noise without deteriorating other image quality characteristics has not been proposed. In connection with this, let us consider a case of processing a noise-contained image on an original document, such as a generation image.

In order to improve the sharpness of the image, if the convolution operation of the unsharpness mask and the image is used for the sharpness emphasizing process, the sharpness is emphasized, but the image noise is also amplified, deteriorating the granularity quality of the image.

Attempts to reduce the noise produce an image of poor sharpness. The resultant image is a so-called "sleepy" image.

This unwanted phenomenon of the document image noise is observed also in the document image suffering from irregularity, tone steps (pseudo contour), and the like.

SUMMARY OF THE INVENTION

The present invention has been made in view of the above circumstances and has an object to provide an image signal processing method which reduces image noise, tone steps and the like contained in an image on an original document without deteriorating the sharpness (color tone and sharpness for a color image), with an inventive and unique construction arranged in consideration of the visual property to noise in the ophthalmencephalon.

Another object of the present invention is to provide an image signal processing apparatus for executing the image signal processing method as just mentioned.

To achieve the above object, the invention provides an image signal processing method in which an image data signal input by an image input terminal is converted into another image data signal suitable for an image output terminal, including the steps of superposing noise of a spatial frequency characteristic difficult to visually perceive on the input image data signal in accordance with a level of the input image data signal, and transferring the image data signal having the noise thus superposed thereon to the image output terminal.

Further, the invention provides an image signal processing apparatus for converting an image data signal input by an image input terminal into another image data signal suitable for an image output terminal, including noise generating means for generating a quantity of noise of a spatial frequency characteristic difficult to visually perceive in accordance with a level of the input image data signal, and noise superposing means for superposing the noise generated by the noise generating means on the input image data signal.

Furthermore, the invention provides an image signal processing apparatus for converting a color image data signal input by an image input terminal into another color image data signal suitable for an image output terminal, including noise generating means for generating a quantity of noise of a spatial frequency characteristic difficult to visually perceive in accordance with a level of the input color image data signal, and noise superposing means for superposing the noise generated by the noise generating means on the color image data signal in a regional color space difficult to visually perceive.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

DETAILED DESCRIPTION OF THE PREFERRED EMBODIMENTS

Before proceeding with the detailed description of the preferred modes of the present invention, the concepts of the invention will be described with reference to FIGS. 1(a) and 1(b).

Figure 1A:
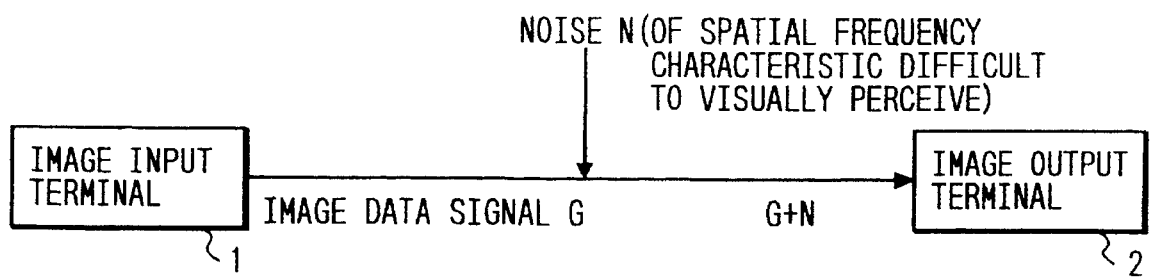
FIG. 1(a) is a block diagram showing the concept of an image signal processing method according to the present invention.

In an image signal processing method of the present invention, as shown in FIG. 1(a), when an image data signal G input by an image input terminal 1 is converted into another image data signal G suitable for an image output terminal 2, noise N of a spatial frequency characteristic difficult to visually perceive is superposed on the input image data signal G in accordance with a level of the input image data signal G. The image data signal G having the noise N thus superposed thereon is transferred to the image output terminal 2.

Figure 1B:
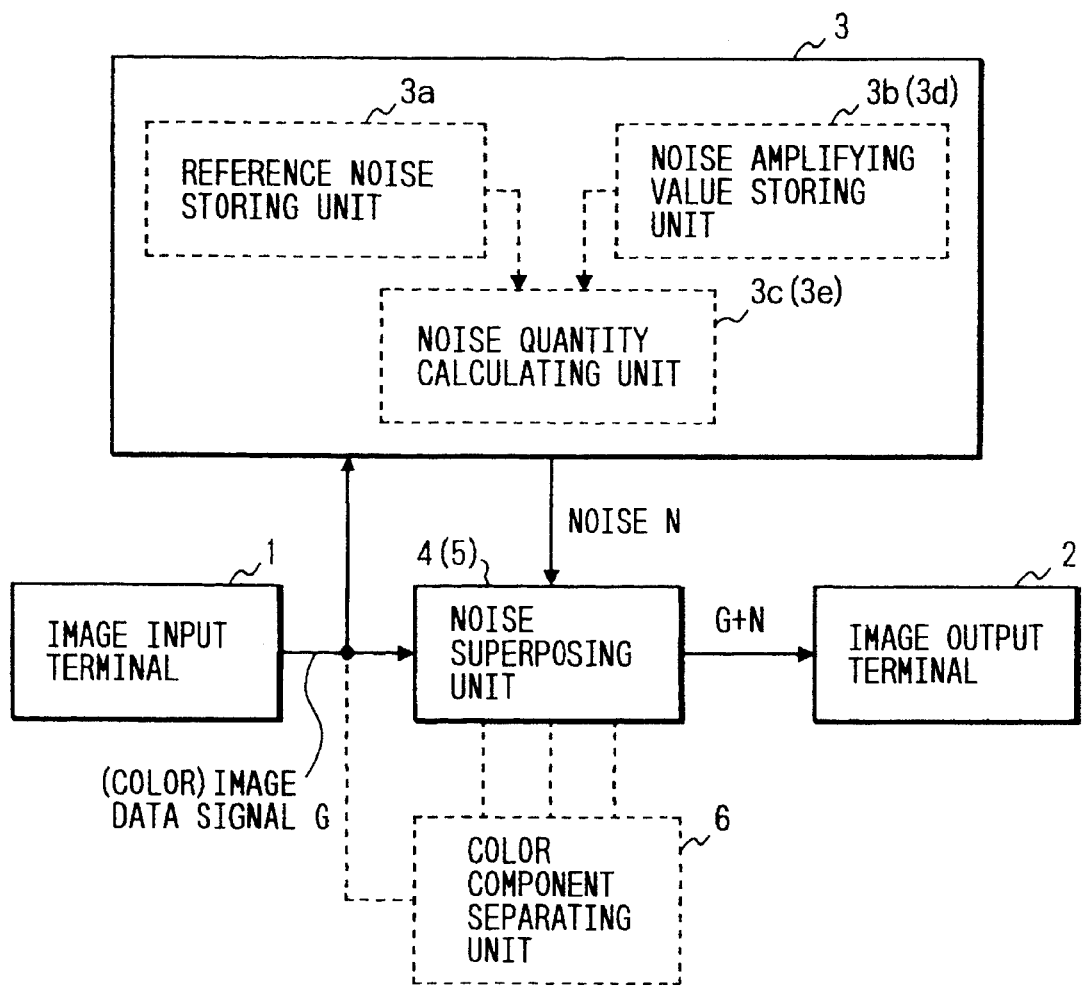
FIG. 1(b) is a block diagram showing the concept of an image signal processing apparatus according to the present invention.

An image signal processing apparatus of the present invention for executing the image signal processing method may be described as an image signal processing apparatus for converting an image data signal G input by an image input terminal 1 into another image data signal G suitable for an image output terminal 2, as shown in FIG. 1(b), including: a noise generating unit 3 for generating a quantity of noise N of a spatial frequency characteristic difficult to visually perceive in accordance with a level of the input image data signal G; and a noise superposing unit 4 for superposing the noise N generated by the noise generating unit 3 on the image data signal.

In handling a color image data signal by the image signal processing apparatus, it is preferable to use a noise superposing unit 5 for superposing the noise N on the color image data signal G in a regional color space difficult to visually perceive (FIG. 1(b)).

Any unit capable of generating the noise N of a spatial frequency characteristic difficult to visually perceive may be used for the noise generating unit 3. In designing the noise generating unit 3, it is preferable to take the level of the image data signal into consideration, in order to secure a finer noise quantity control.

To make the noise quantity control easy, it is preferable that the noise generating unit 3, as shown in FIG. 1(b), includes a reference noise storing unit 3a for previously storing data of the noise of a spatial frequency characteristic difficult to visually perceive, a first noise amplifying value storing unit 3b for previously storing amplifying values of noise to the image data signal, and a first noise quantity calculating unit 3c for calculating a quantity of noise to be superposed on the image data signal by using the noise data stored in the reference noise storing unit 3a and the noise amplifying values stored in the noise amplifying value storing unit 3b.

For the image output terminal 2 having half-tone generating means of the myriad line screen type, it is preferable that the noise generating unit 3 is designed so as to generate noise of a frequency equal to or lower than the fundamental frequency of the screen generated by the half-tone generating unit. The noise frequency thus selected effectively eliminates interference between the superposed noise N and the screen generated by the half-tone generating unit.

Further, in the noise generating unit 3, the data of noise of a spatial frequency characteristic difficult to visually perceive may be properly formed. To form the data of noise of spatial frequency characteristic more difficult to visually perceive, it is preferable that the noise generating unit 3 generates noise N of a spatial frequency characteristic difficult to visually perceive, which is an inversion of the visual property of a human being for noise, on the basis of random noise data of the normal distribution type.

In handling a color image data signal, the visual properties are different with the color components thereof. It is desirable to finely control the quantities of noise superposed on the image data signal. For example, a small quantity of noise is superposed on a color component of high visual characteristic to the noise, and a large quantity of noise is superposed on a color component of low visual characteristic to the noise. Alternatively, the noise is superposed on only the color component of low visual characteristic to the noise.

The fine noise quantity control may be achieved by the image signal processing apparatus handling the color image data signals when it is arranged such that, as shown in FIG. 1(b), a color component separating unit 6 for separating the color image data signal into color signals defining a color space is provided, and the noise superposing unit 5 superposes the quantities of noise N respectively to those color components separated by the color component separating unit 6.

More specifically, the just-mentioned image signal processing apparatus, which superposes the quantities of noise N respectively to the color components, includes the noise generating unit 3 including the reference noise storing unit 3a for previously storing data of the noise of a spatial frequency characteristic difficult to visually perceive, a second noise amplifying value storing unit 3d for previously storing amplifying values of noise to the color components separated by the color component separating unit 6, and a second noise quantity calculating unit 3e for calculating the quantities of noise to be superposed on the color components by using the noise data stored in the reference noise storing unit 3a and the noise amplifying values stored in the second noise amplifying value storing unit 3d. The second noise amplifying value storing unit 3d and second noise quantity calculating unit 3e may be provided exclusively for each color component or for all of the color components.

The operations of the respective units as mentioned above will be described with reference to FIG. 1(b).

In the figure, the noise generating unit 3 generates noise N, of which the spatial frequency characteristic is difficult to visually perceive and the quantity is set in accordance with a level of the image data signal G.

The noise superposing unit 4 (5) superposes the quantity of noise N thus generated on the image data signal. Particularly, the noise superposing unit 5 handling the color image data signal superposes the noise on a color image data signal G in a regional color space difficult to visually perceive.

The noise N thus superposed, not perceived visually, operates to cancel the visual adverse effects by the image noise, tone steps (pseudo contour), and the like, which are inherently contained in the input image data signal.

In the image signal processing apparatus where the noise generating unit 3 is comprised of the reference noise storing unit 3a, the first noise amplifying value storing unit 3b, and the first noise quantity calculating unit 3c, part of the image data signal input by the image input terminal 1 is transferred to the first noise quantity calculating unit 3c. Then, a noise amplifying value for the value of the input image data signal is read out of the first noise amplifying value storing unit 3b. At the same time, the noise data previously stored in the reference noise storing unit 3a is also transferred to the first noise quantity calculating unit 3c. The first noise quantity calculating unit 3c calculates a quantity of noise using the noise amplifying value and the noise data.

The image signal processing apparatus handling the color image data signal G, which includes the color component separating unit 6 and the noise superposing unit 5 for superposing the quantities of noise every color component, and the noise generating unit 3 including the reference noise storing unit 3a, the second noise amplifying value storing unit 3d, and the second noise quantity calculating unit 3e, operates in the following manner.

The color image data signal G is separated into color components in a color space, e.g., a value data signal and chromaticity data signal in a uniform color space L* a* b*, and the signals of these color components are transferred to the second noise quantity calculating unit 3e and the noise superposing unit 5. Then, the noise amplifying values for the value data signal and the chromaticity data signal are read out of the second noise amplifying value storing unit 3c. The noise data previously stored in the reference noise storing unit 3a is read out and transferred to the second noise quantity calculating unit 3e. The second noise quantity calculating unit 3e calculates the quantities of noise for the value data signal and the chromaticity data signal by using the noise amplifying values and the noise data, and applies the quantities of noise for the value data signal and the chromaticity data signal to the noise superposing unit 5.

Afterwards, the noise superposing unit 5 superposes the noise to both or either of the value data signal and the chromaticity data signal.

Some preferred modes of the present invention will be described with reference to FIGS. 2 through 14.

Figure 2:
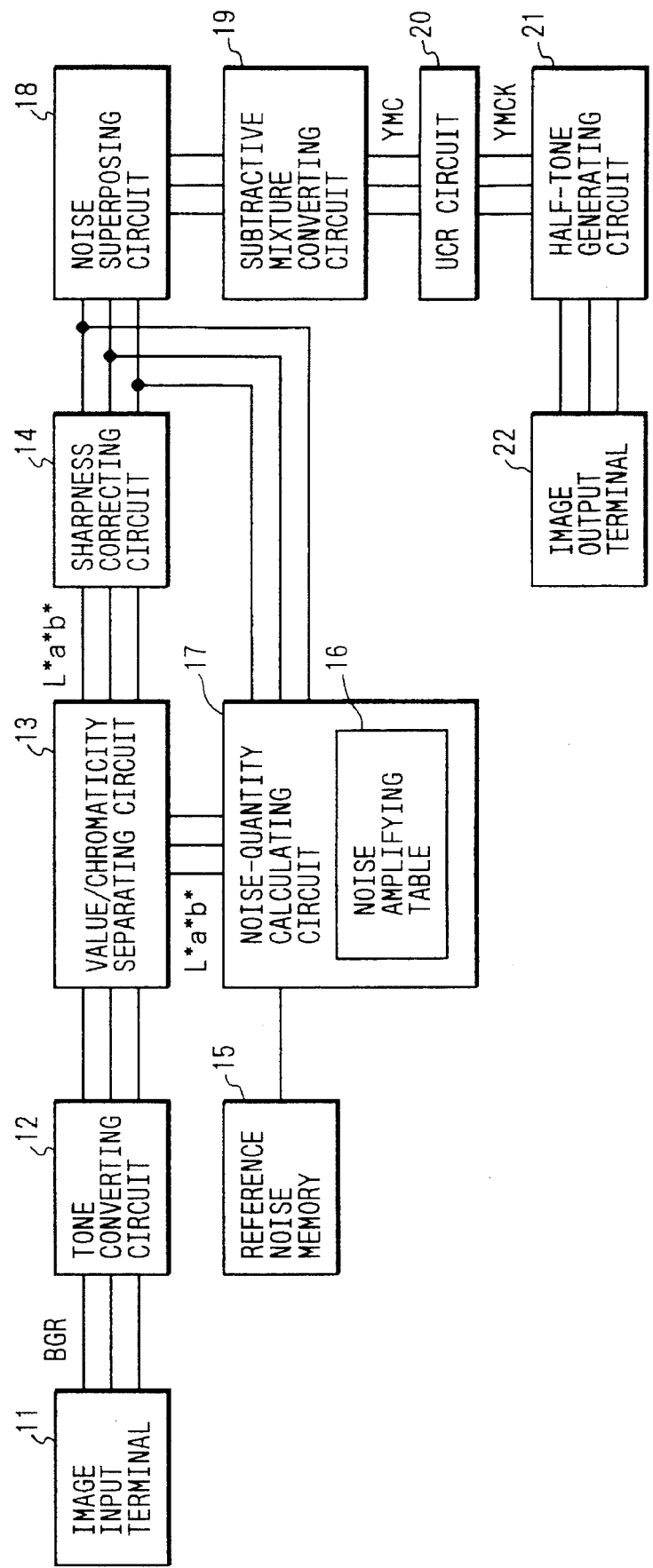
FIG. 2 is a block diagram showing a color copying machine as an embodiment of the present invention.

FIG. 2 is a block diagram showing a color copying machine as an embodiment of the present invention.

In the figure, the color copying machine includes an image input terminal (IIT) 11, a tone converting circuit 12, a value/chromaticity separating circuit 13, a sharpness correcting circuit 14, a reference noise memory 15, a noise amplifying table 16, a noise-quantity calculating circuit 17, a noise superposing circuit 18, a subtractive mixture converting circuit 19, a UCR circuit 20, a half-tone generating circuit 21, and an image output terminal (IOT) 22. The tone converting circuit 12 converts the tone of the input image data signal. The value/chromaticity separating circuit 13 separates the image data signal from the tone converting circuit 12 into a value data signal L* and chromatic data signals a* and b*. The sharpness correcting circuit 14 corrects a sharpness of the image data. The reference noise memory 15 stores reference noise data. The noise amplifying table 16 stores noise amplifying values for the value data signal L* and the chromatic data signals a* and b*. The noise-quantity calculating circuit 17 calculates the quantities of noise using the noise data and the noise amplifying values for the image data signals. The noise superposing circuit 18 superposes the quantities of noise calculated by the circuit 17 on the image data signals. The subtractive mixture converting circuit 19 converts the image data signals into subtractive mixture data signals. The UCR circuit 20 generates real block data. The half-tone generating circuit 21 generates half-tone data. The image output terminal 22 outputs the image data signals processed by those circuit blocks in the image processing system of the color copying machine. The image processing system thus arranged superposes the prestored noise data on the image data signal in accordance with a level of the image data signal per se.

The image input terminal 11, which is for inputting a color image, is a color image input device for optically reading a color image on an original document and converting the read color image to image data signals. A color television camera, a color image scanner, or the like may be enumerated for this image input device. The image data signals output from the image input terminal 11 consist of three color components R, G and B each being expressed in the form of a pixel of 8 bits.

The tone converting circuit 12 includes memory tables for converting the color image data signals R, G and B to equivalent values.

The value/chromaticity separating circuit 13 further converts the equivalent values of the R, G and B color components to a value data signal and chromaticity data signals. In this embodiment, a 3×10 matrix operation converts the equivalent signals to the color components of the CIE L* a* b* color space as a uniform color space.

Figure 3:
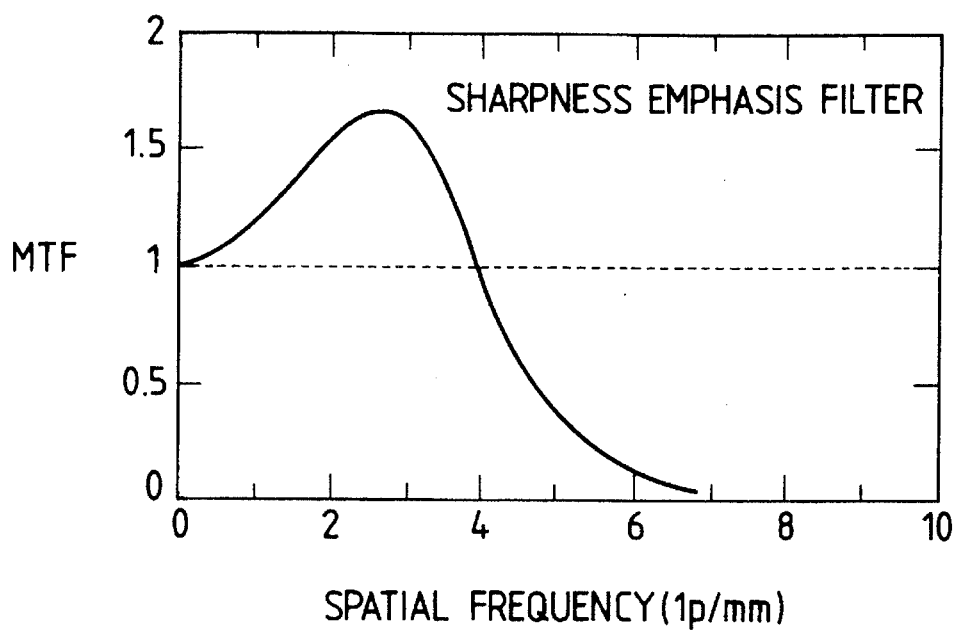
FIG. 3 is a graph showing the spatial frequency characteristic of a sharpness emphasis filter used in the embodiment.
Figure 4:
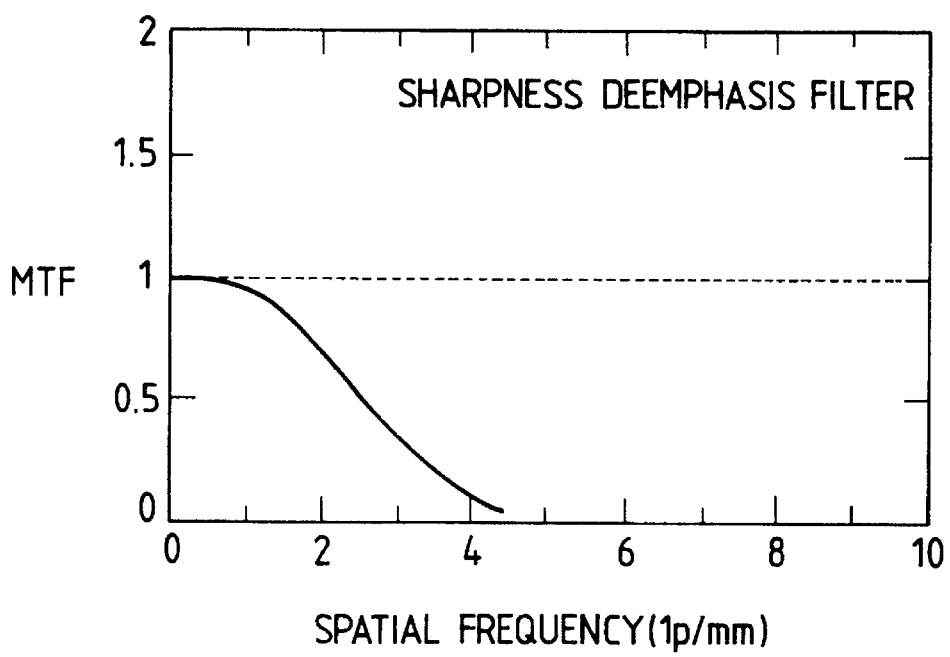
FIG. 4 is a graph showing the spatial frequency characteristic of a sharpness deemphasis filter used in the embodiment.

As already referred to, it is a common practice that the method of performing the convolution operation of the unsharpness mask and the image is employed for the sharpness correction. However, in the sharpness correcting circuit 14 of this embodiment, filters of different characteristics are used for the sharpness emphasis process for the value data signal and the sharpness deemphasis process for the chromaticity data signals. Examples of the spatial frequency characteristics of the sharpness emphasis filter and the sharpness deemphasis filter, which are used in this embodiment, are shown in FIGS. 3 and 4 (in the figures, MTF is the abbreviation of modulation transfer function).

As the result of those processes, the L* component is emphasized in sharpness, and the a* and b* components are deemphasized in sharpness.

The reference noise memory 15 includes a memory device storing noise data.

The noise data used in this embodiment is prepared in the following way.

Figure 5:
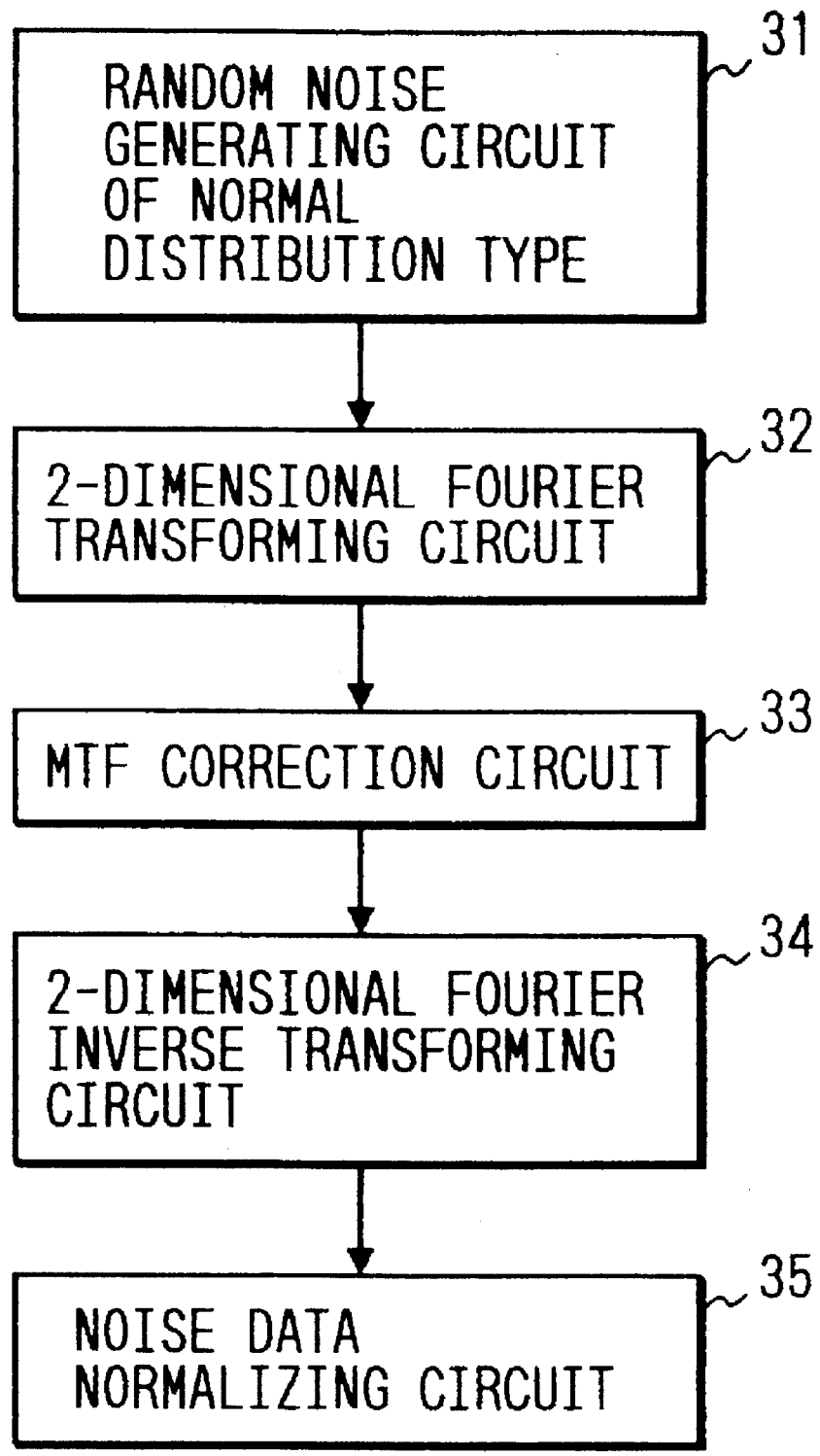
FIG. 5 is a block diagram showing a noise data generating circuit used in the embodiment.

In FIG. 5 showing a process of generating the noise data, a random noise generating circuit of normal distribution type 31 generates the noise data by using the algorithm by Box & Muller, expressed by Formula 1:

Formula 1

$u_1 = RND(1)$
$u_2 = RND(2)$ where RND(1) and RND(2) : uniform random number generating functions $$NOISE_{(x, y)}=(-2\times \log (u_1))^{1/2}\times \cos (2\pi_2)$$

where

Figure 7:
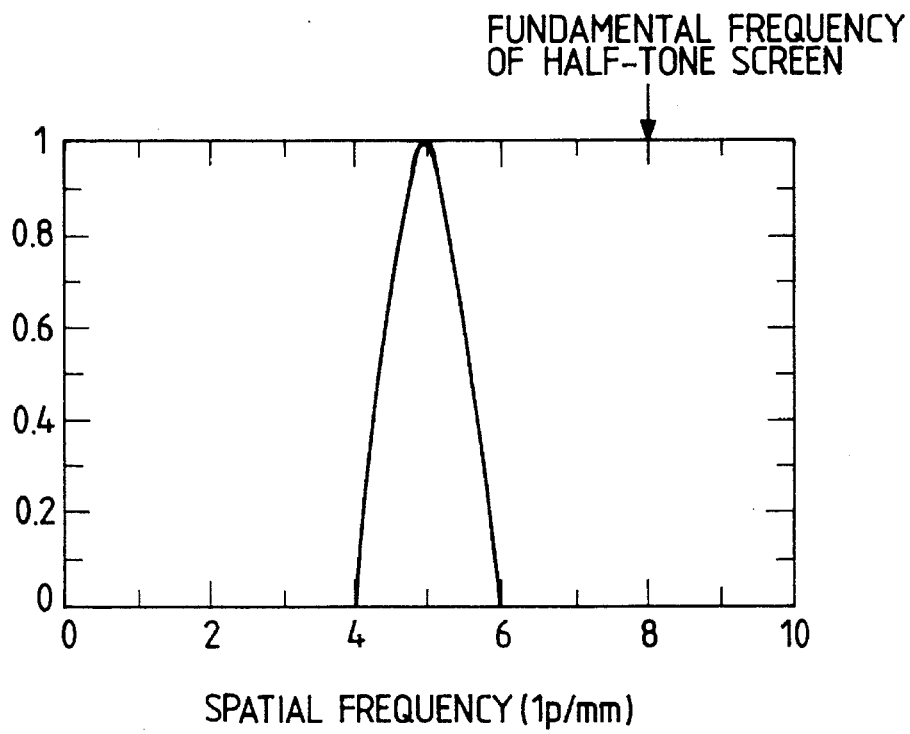
FIG. 7 is a graph showing a spatial frequency characteristic of the noise used in the embodiment.

X=1, 2, . . . , : total number of pixels in the x-direction y=1, 2, . . . , : total number of pixels in the y-direction The generated noise data is applied to a 2-dimensional Fourier transforming circuit 32 where it is 2-dimensional Fourier transformed. The noise data is then applied to an MTF correction circuit 33 where the spatial frequency characteristic of the noise data is corrected. An example of the spatial frequency characteristic used in this embodiment is shown in FIG. 7.

Figure 6:
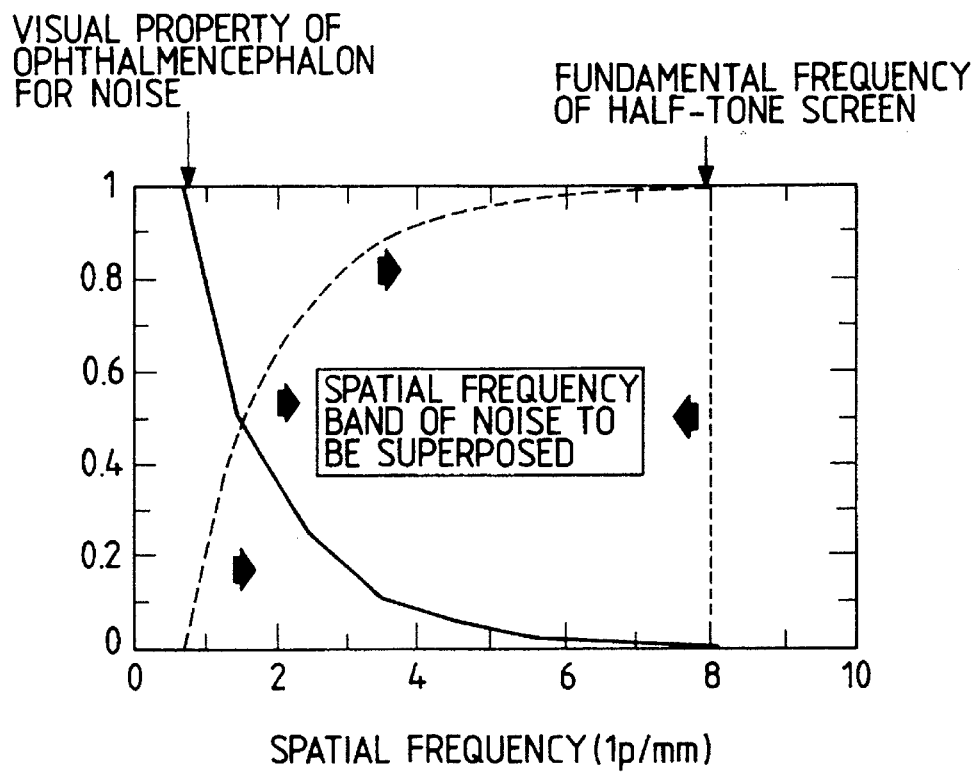
FIG. 6 is a graph showing a spatial frequency band of the noise to be superposed in the embodiment.

The MTF correction circuit 33 applies a spatial frequency characteristic (indicated by a dotted line in FIG. 6) as an inversion of the noise visual property (indicated by a continuous line in FIG. 6) of a human being to the random noise of the normal distribution type. The spatial frequency band of noise data is limited to be below the fundamental frequency of the myriad line screen of the half-tone generating circuit 21, as shown in FIG. 6.

Next, the noise data is returned to be in a real space by a 2-dimensional Fourier inverse transforming circuit 34. Finally, the noise data is normalized to standard deviation $\sigma$ =1 by a noise data normalizing circuit 35. The normalized data is stored into the reference noise memory 15.

Figure 8:
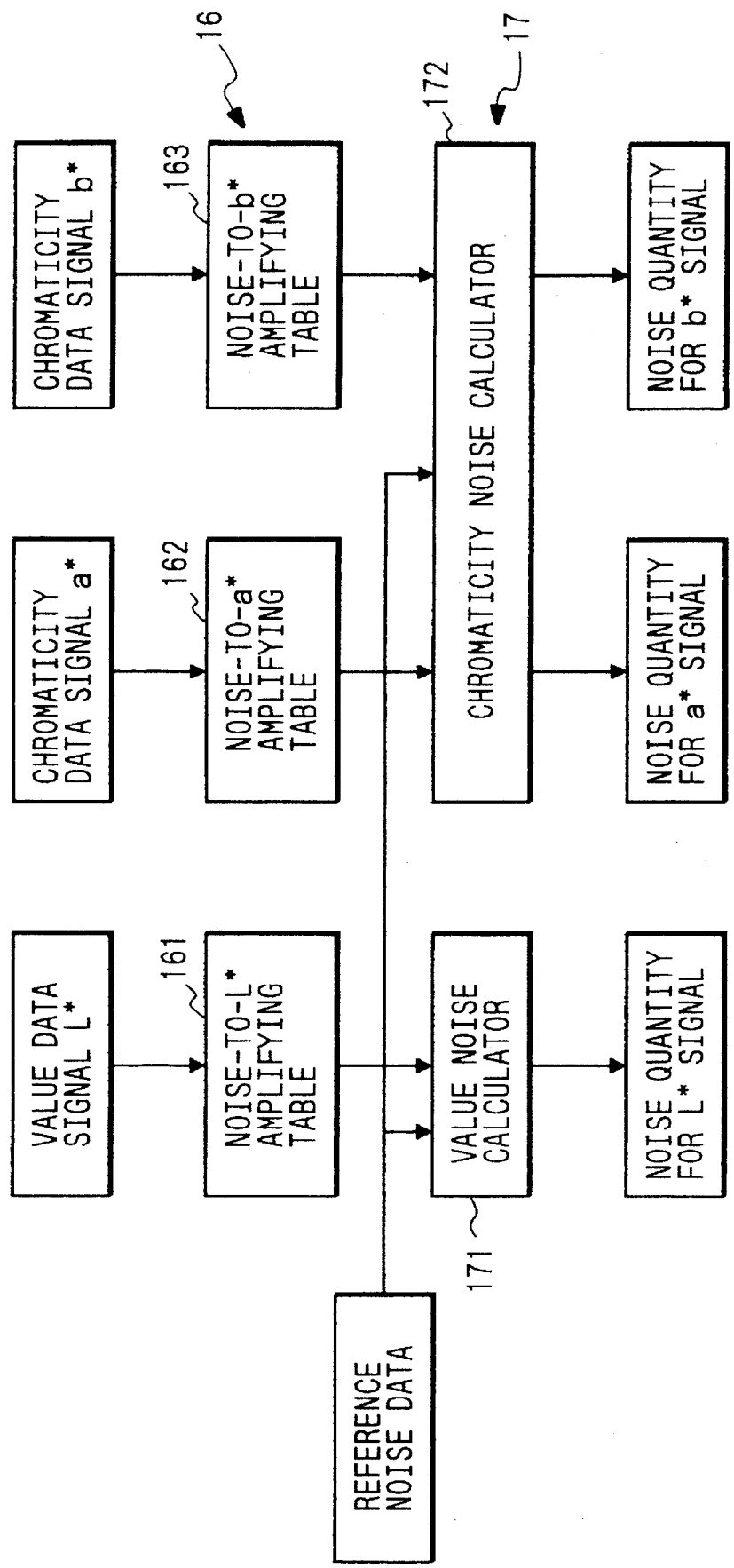
FIG. 8 is a block diagram showing an electrical arrangement including a noise amplifying table and a noise-quantity calculating circuit in the image processing system.

The noise amplifying table 16, as shown in FIG. 8, includes a noise-to-L* amplifying table 161 storing a noise amplifying value for the value data signal (denoted as L*), and a noise-to-a* amplifying table 162 and a noise-to-b* amplifying table 163 storing noise amplifying values for the chromatic data signals (denoted as a* and b*).

Figure 9:
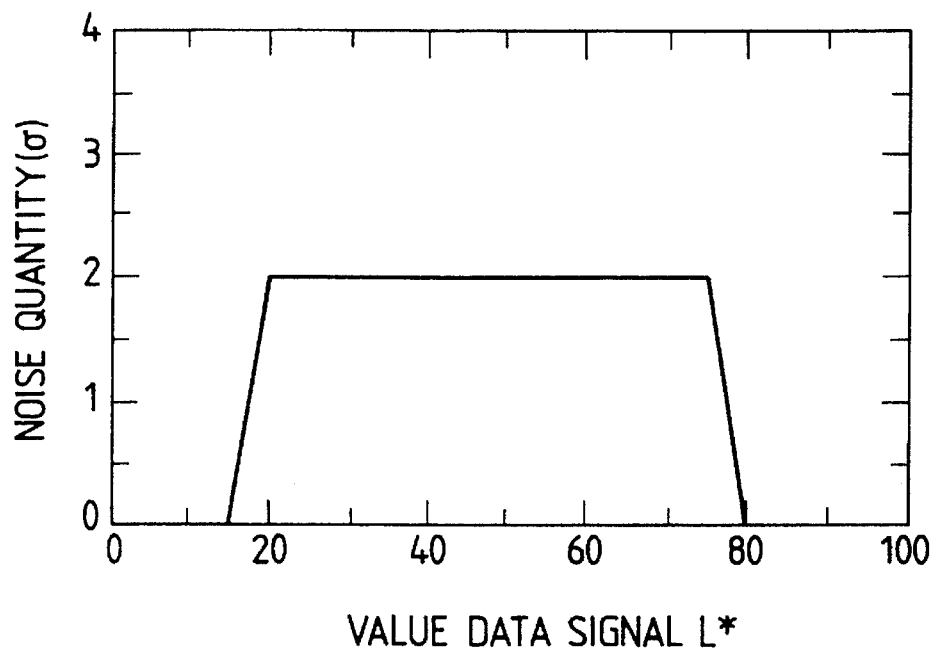
FIG. 9 is a graph showing the characteristic of the noise amplifying table to a value data signal L*.
Figure 10:
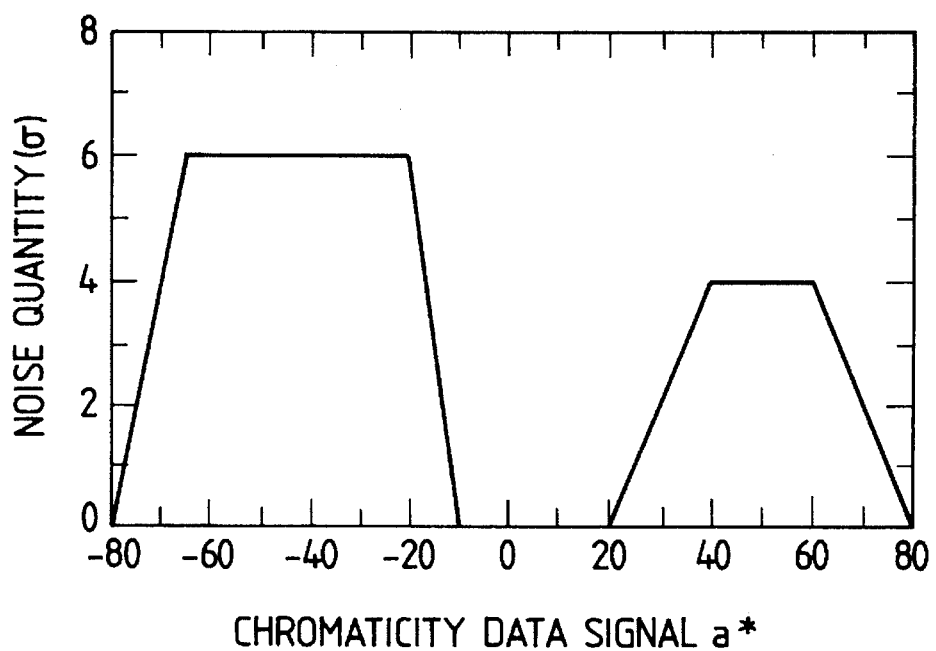
FIG. 10 is a graph showing the characteristic of the noise amplifying table to a chromaticity data signal a*.
Figure 11:
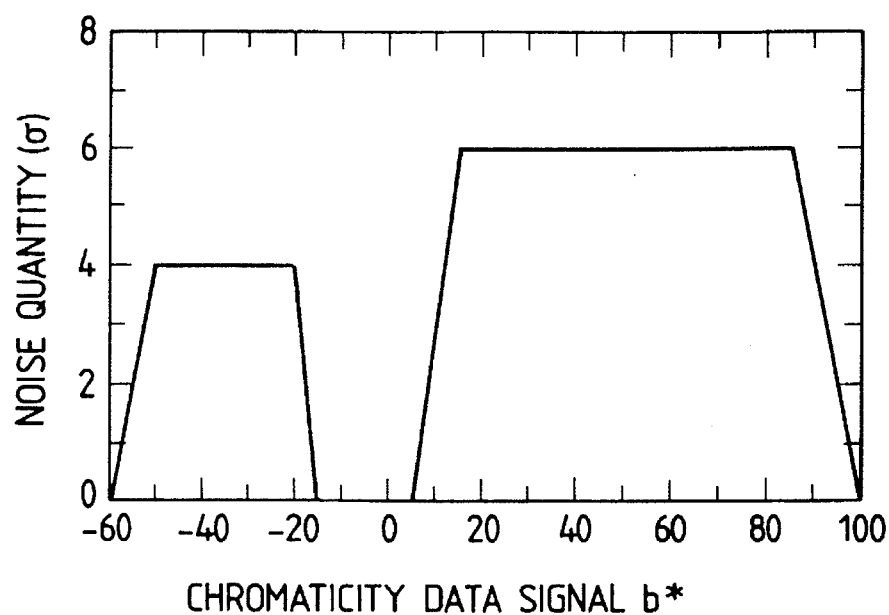
FIG. 11 is a graph showing the characteristic of the noise amplifying table to a chromaticity data signal b*.

The characteristics of those tables 161 through 163 are shown in FIGS. 9 through 11.

In FIGS. 10 and 11, the quantity of noise is set to 0 in the region near to 0 of the chromaticity data signals a* and b*. The reason for this is that the chromaticity is easy to be visually perceived in this region, thereby to change the color when noise is superposed.

The noise-quantity calculating circuit 17, as shown in FIG. 8, includes a value noise calculator 171 for calculating a quantity of noise to the value data signal and a chromaticity noise calculator 172 for calculating a quantity of noise to the chromaticity data signals.

The noise-quantity calculating circuit 17 reads the noise amplifying values for the input image data signals and performs the operations given by Formula 2 by using the readout noise amplifying values and the noise data read out of the reference noise memory 15 as given by Formula 2.

Formula 2

$$NOISE_{L(x, y)}=LUT_L(L_{(x, y)})\times NOISE_{(x, y)}$$

$$NOISE_{a(x, y)}=LUT_a(a_{(x, y)})\times NOISE_{(x, y)}$$

$$NOISE_{b(x, y)}=LUT_b(b_{(x, y)})\times NOISE_{(x, y)}$$

$$NOISE_{C(x, y)}=((NOISE_{a(x, y)})^2\times (NOISE_{b(x, y)})^2)^{1/2}$$

$$NOISE'_{a(x, y)}=sign(NOISE_{(x, y)})\times NOISE_{C(x, y)}\times |a(x, y)|/((a_{(x, y)})^2+(b_{(x, y)})^2)^{1/2}$$

$$NOISE'_{b(x, y)}=sign(NOISE_{(x, y)})\times NOISE_{C(x, y)}\times |b(x, y)|/((a_{(x, y)})^2+(b_{(x, y)})^2)^{1/2}$$

where

X=1, 2, . . . , : total number of pixels in the x-direction y=1, 2, . . . , : total number of pixels in the y-direction In Formula 2, $L_{(x,y)}$, $a_{(x,y)}$, and $b_{(x, y)}$ indicate the (x, y)th image data signals; $LUT_L$, $LUT_a$, and $LUT_b$, the noise-to-L*, noise-to-a* , and noise-to-b* amplifying tables; $NOISE_{(x, y)}$, the (x, y)th noise data; $NOISE_{(Lx, y)}$, a quantity of noise to the (x, y)th value data $L_{(x, y)}$; $NOISE_{a(x,y)}$ and $NOISE_{b(x, y)}$, the quantities of noise to the (x, y)th chromaticity data $a_{(x, y)}$ and $b_{(x, y)}$; $NOISE_{C(x, y)}$, a quantity of noise to the saturation axis calculated from the quantity of noise to the chromaticity data $a_{(x, y)}$ and $b_{(x, y)}$; $NOISE'_{a(x, y)}$ and $NOISE'_{b(x, y)}$ quantities of noise used when the noise is superposed on the (x, y)th chromaticity data a* and b* only in the saturation axis; and sign ($NOISE_{(x, y)}$), positive or negative sign of the noise data.

The quantities of noise for the respective image data signals are obtained through the above operations, and the resultant noise quantities are transferred to the noise superposing circuit 18.

Figure 12:
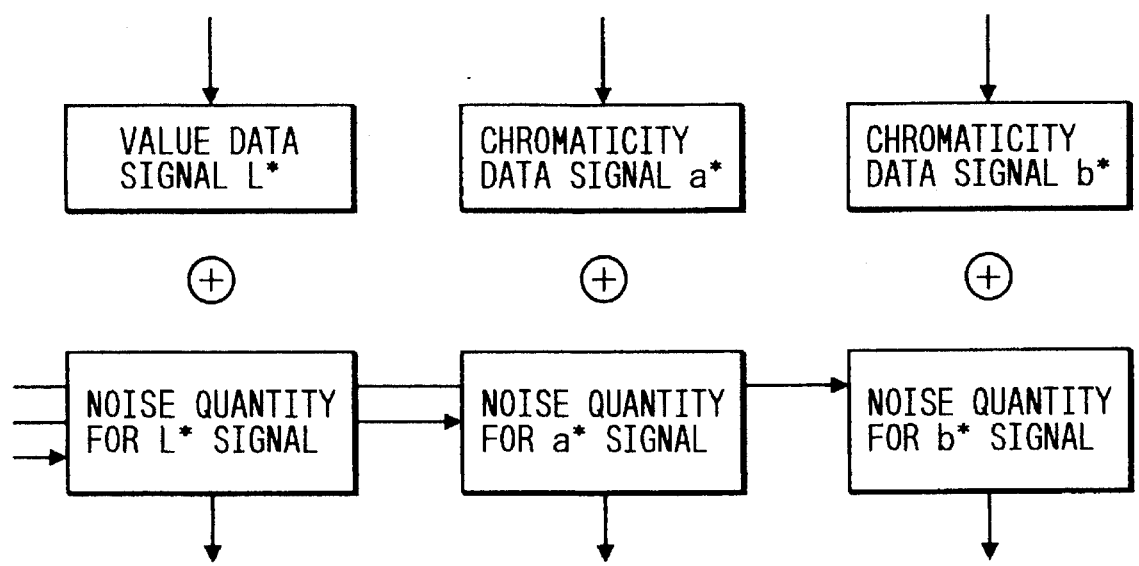
FIG. 12 is a block diagram showing an example of operation of a noise superposing circuit in the embodiment.

In the noise superposing circuit 18, as shown in FIG. 12, the quantities of noise from the noise-quantity calculating circuit 17 are superposed on the image data signals.

The superposing operations of the noise to the image data signals are carried out by using the following Formula 3.

Formula 3

$$L'_{(x, y)}=L_{(x, y)}+NOISE_{L(x, y)}$$

$$a'_{(x, y)}=a_{(x, y)}+NOISE'_{a(x, y)}$$

$$b'_{(x, y)}=b_{(x, y)}+NOISE'_{b(x, y)}$$

where

X=1, 2, . . . , : total number of pixels in the x-direction y=1, 2, . . . , : total number of pixels in the y-direction Finally, the image data signals having the noise superposed thereon are processed by the subtractive mixture converting circuit 19, the UCR circuit 20, and the half-tone generating circuit 21, and transferred to the image output terminal 22 which then outputs the image data signals in the form of a reproduced image.

Tests to evaluate the performance of the image signal processing apparatus constructed according to the present embodiment were conducted. Samples of noise-superposed images were reproduced by the apparatus. Granularities of the reproduced images were sensuously evaluated. The original document was a 175-line printed matter of a general portrait. The machine to print the document was a general color xerography system.

The sensuous test was conducted by 20 testees and in the following way.

Sensuous Test

The noise-superposed color copy samples were sorted into 10 categories. The criterion for the sorting was levels of the granularity on the noise-superposed images with respect to a reference image (image on which noise is not superposed). Those categories were arranged such that the reference image belongs to the category No. 7, the worst image (image sample formed by superposing uniform noise of $\sigma$=20 on the value data L*) belongs to the category No. 1, and the categories were equidistantly spaced.

10 Level Categories

No. 1 Remarkably noisier than the reference sample

No. 2
No. 3
No. 4 Noisier than the reference sample
No. 5
No. 6
No. 7 Equal to the noise of the reference sample
No. 8
No. 9
No. 10 Less noisy than the reference sample The result of evaluating the image samples by 20 testees showed 8.2 points in average.

The image signal processing method thus far described superposes the quantities of the noise respectively on the color data of the value axis L* and the saturation axis (C* : result of composing the color data a* and b*). The noise may be superposed on only the image data of the L* axis or only the image data of the C* axis. Alternatively, the noise may be interactively superposed on those image data.

Figure 13:
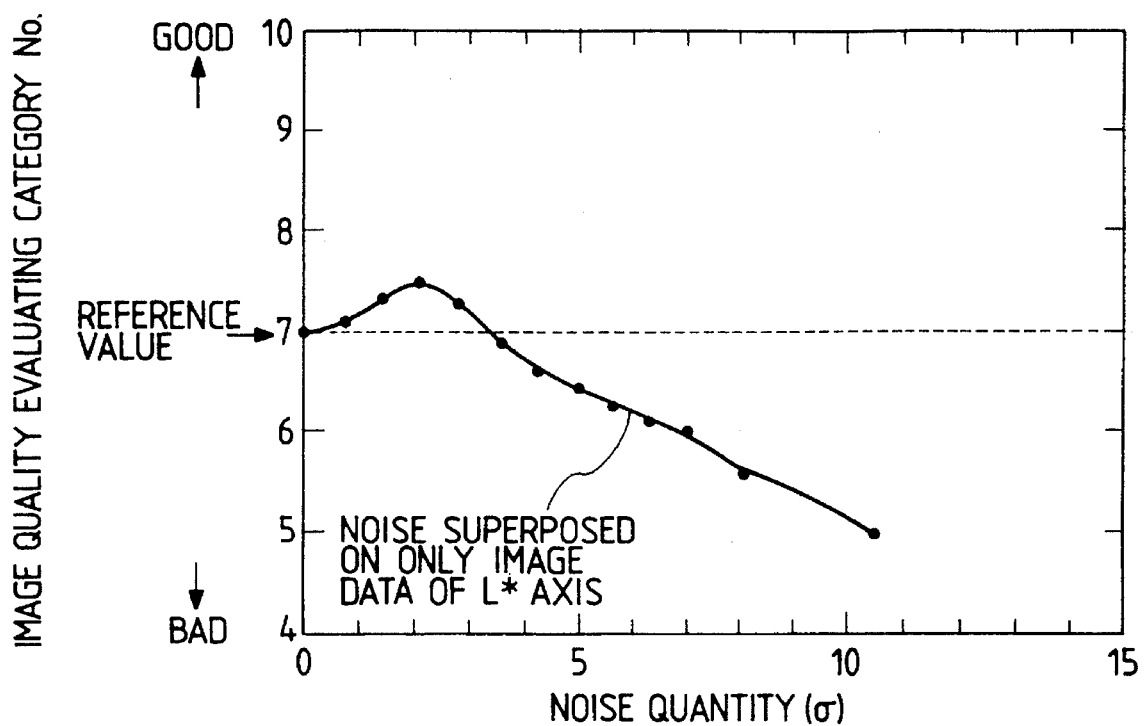
FIG. 13 is a graph showing the results of a test of evaluating the picture qualities of image examples when the noise is superposed on only the image data of the L* axis.
Figure 14:
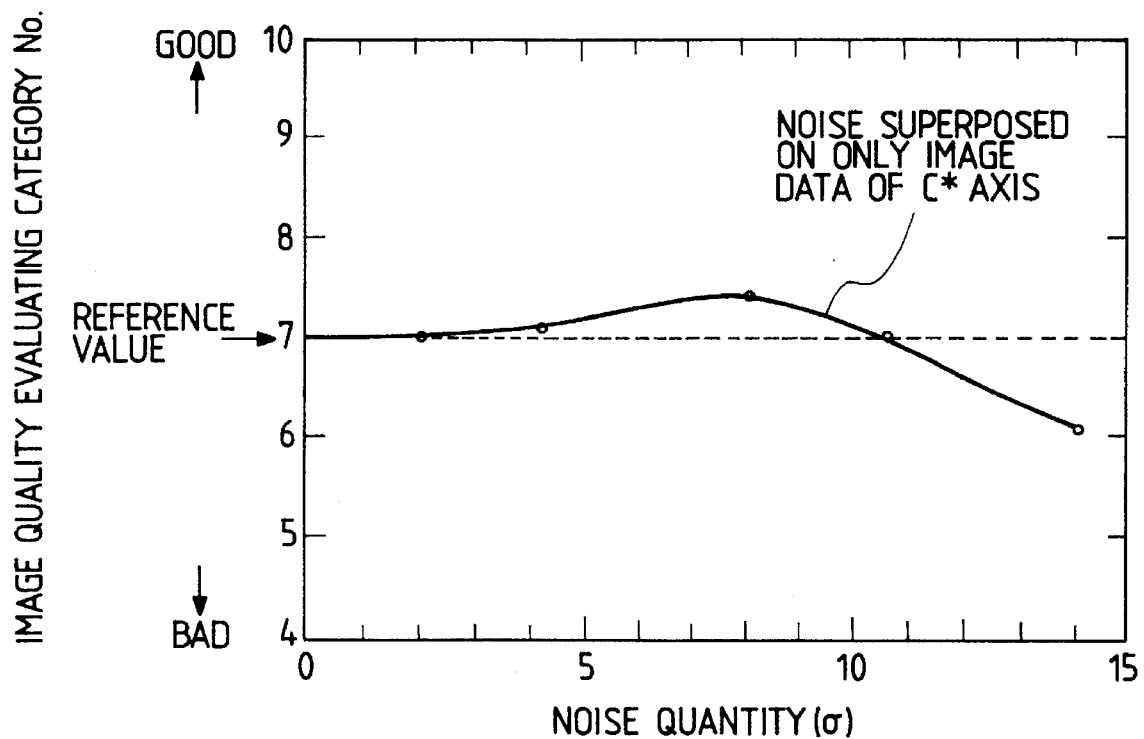
FIG. 14 is a graph showing the results of a test of evaluating the picture qualities of image examples when the noise is superposed on only the image data of the C* axis.

The results of the sensuous test on the sample images when the noise is superposed on only the image signal of the L* axis are shown in FIG. 13. Further, the results of the sensuous test on the sample images when the noise is superposed on only the image signal of the C* axis are shown in FIG. 14.

The graphs teach that the test results on the image samples when the noise is superposed substantially on the image data of the L* axis or the image data of the C* axis are comparable with those when the noise of different quantities are superposed on the image data of the L* axis and the C* axis, respectively.

As described heretofore, in the present invention, noise of a spatial frequency characteristic difficult to visually perceive is superposed on the input image data signal in accordance with a level of the input image data signal, on the basis of the visual property of a human being for noise. The noise thus superposed, not perceived visually, operates to cancel the visual adverse effects by the image noise, tone steps (pseudo contour), and the like, which are inherently contained in the input image data signal. The reproduced image is clear and good in quality.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image signal processing apparatus for converting an image data signal input by an image input terminal into another image data signal suitable for an image output terminal; comprising:

noise generating means for generating a quantity of noise of a spatial frequency characteristic difficult to visually perceive in accordance with a level of the input image data signal, wherein the noise generating means generates noise of a frequency equal to or lower than a fundamental frequency of a screen generated by halftone generating means in said image output terminal; and noise superposing means for superposing only the noise generated by said noise generating means on the input image data signal.

2. The image signal processing apparatus according to claim 1, wherein said noise generating means comprises reference noise storing means for previously storing data of the noise of a spatial frequency characteristic difficult to visually perceive, noise amplifying value storing means for previously storing amplifying values of noise to the image data signal, and noise quantity calculating means for calculating a quantity of noise to be superposed on the image data signal by using the noise data stored in said reference noise storing means and the noise amplifying values stored in said noise amplifying value storing means.

3. The image signal processing apparatus according to claim 1, wherein said noise generating means generates noise of a spatial frequency characteristic difficult to visually perceive, which is an inversion of the visual property of a human being for noise, on the basis of random noise data of a normal distribution type.

4. An image signal processing apparatus for converting a color image data signal input by an image input terminal into another color image data signal suitable for an image output terminal, comprising:

noise generating means for generating a quantity of noise of a spatial frequency characteristic difficult to visually perceive in accordance with a level of the input color image data signal, wherein the noise generating means generates noise of a frequency equal to or lower than a fundamental frequency of a screen generated by halftone generating means in said image output terminal; and noise superposing means for superposing only the noise generated by said noise generating means on the color image data signal in a regional color space difficult to visually perceive.

5. The image signal processing apparatus according to claim 4, wherein said noise generating means comprises reference noise storing means for previously storing data of the noise of a spatial frequency characteristic difficult to visually perceive, noise amplifying value storing means for previously storing amplifying values of noise to the image data signal, and noise quantity calculating means for calculating a quantity of noise to be superposed on the image data signal by using the noise data stored in said reference noise storing means and the noise amplifying values stored in said noise amplifying value storing means.

6. The image signal processing apparatus according to claim 4, wherein said noise generating means generates noise of a spatial frequency characteristic difficult to visually perceive, which is an inversion of the visual property of a human being for noise, on the basis of random noise data of a normal distribution type.

7. The image signal processing apparatus according to claim 4, further comprising color component separating means for separating the color image data signal into color component signals defining a color space, wherein said noise superposing means superposes noise respectively to the color component signals separated by said color component separating means.

8. The image signal processing apparatus according to claim 7, wherein said noise generating means comprises reference noise storing means for previously storing data of the noise of a spatial frequency characteristic difficult to visually perceive, noise amplifying value storing means for previously storing amplifying values of noise to the color component signals separated by said color component separating means, and noise quantity calculating means for calculating the quantities of noise to be superposed on the color component signals by using the noise data stored in said reference noise storing means and the noise amplifying values stored in said noise amplifying value storing means.

* * * * *